United States Patent
Koike et al.

[11] Patent Number: 6,037,039
[45] Date of Patent: *Mar. 14, 2000

[54] BIODEGRADABLE ARTICLE

[75] Inventors: Mamoru Koike; Tomoyoshi Tsurufuji, both of Saitama, Japan

[73] Assignee: Daiwa Seiko, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/742,701

[22] Filed: Nov. 4, 1996

Related U.S. Application Data

[63] Continuation-in-part of application No. 08/356,538, Dec. 15, 1994, abandoned.

[30] Foreign Application Priority Data

Jan. 31, 1994 [JP] Japan .................................... 6-009388

[51] Int. Cl.⁷ ...................................................... B32B 3/00
[52] U.S. Cl. ........................ 428/195; 428/483; 428/520; 604/378
[58] Field of Search ................................. 428/483, 520, 428/195; 604/378

[56] References Cited

U.S. PATENT DOCUMENTS

| | | | |
|---|---|---|---|
| 2,503,672 | 4/1950 | Johnson et al. | 43/42.28 |
| 2,587,264 | 2/1952 | Wood | 43/42.33 |
| 2,613,471 | 10/1952 | Tracik | 43/42.33 |
| 4,074,455 | 2/1978 | Williams, Jr. | 43/42.06 |
| 4,197,667 | 4/1980 | Helfenstine et al. | 43/42.06 |
| 4,826,493 | 5/1989 | Martini et al. | 604/327 |
| 4,826,691 | 5/1989 | Prochnow | 426/1 |
| 4,827,655 | 5/1989 | Reed | 43/17.5 |
| 4,862,631 | 9/1989 | Wilson et al. | 43/42.33 |
| 4,875,305 | 10/1989 | Bridges | 43/42.06 |
| 4,881,340 | 11/1989 | Davis | 43/42.06 |
| 4,976,060 | 12/1990 | Nienhuis | 43/42.41 |
| 5,007,193 | 4/1991 | Goodley et al. | 43/42.28 |
| 5,044,110 | 9/1991 | Henderson et al. | 43/42.33 |
| 5,063,703 | 11/1991 | Riley | 43/42.06 |
| 5,170,580 | 12/1992 | Rosenblatt | 43/42.06 |
| 5,266,323 | 11/1993 | Guthrie et al. | 424/410 |
| 5,270,044 | 12/1993 | Fulmer et al. | 424/410 |
| 5,276,993 | 1/1994 | Rosenblatt | 43/42.06 |
| 5,299,378 | 4/1994 | Ballard | 43/42.06 |
| 5,333,405 | 8/1994 | Bowles | 43/42.06 |
| 5,470,526 | 11/1995 | Wilfong et al. | 428/36.6 |
| 5,480,693 | 1/1996 | Patterson et al. | 428/36.7 |
| 5,622,756 | 4/1997 | Tokoro et al. | 428/36.5 |

FOREIGN PATENT DOCUMENTS

| | | |
|---|---|---|
| 0427496 A2 | 5/1991 | European Pat. Off. . |
| 56-21231 | 5/1981 | Japan . |
| 56-46-377 | 10/1981 | Japan . |
| 5-43637 | 2/1993 | Japan . |
| 5-41937 | 3/1993 | Japan . |
| 83-00984 | 3/1983 | WIPO . |

*Primary Examiner*—D S. Nakarani
*Attorney, Agent, or Firm*—Longacre & White

[57] ABSTRACT

The invention concerns a biodegradable article which can be used for a period of time of normal use while the performance and quality are maintained high and further the biodegradable article exhibits an excellent biodegradability in the natural environment. The biodegradable article includes: a member body made of biodegradable material having a predetermined profile; and a coat formed on a surface of the member body, wherein the coat delays the biodegradation of the member body for a predetermined period of time.

8 Claims, 4 Drawing Sheets

BIODEGRADABLE ARTICLE

This is a File Wrapper continuation-in-part of application Ser. No. 08/356,538 filed Dec. 15, 1994, which was abandoned upon filing hereof.

BACKGROUND OF THE INVENTION

The present invention relates to a biodegradable article applied to a fishing tackle or a sports article frequently used in a natural environment.

Recently, there is a stream of consciousness to protect the natural environment, and an investigation is made to prevent fishing tackles or sports articles, which are frequently used in the natural environment, from being discarded to the natural environment. To be in more detail, fishing tackles such as fishing lines or sports articles such as tees used for golf are made of resin material such as polyethylene which is very stable in the natural environment. Accordingly, discarded articles are left approximately permanently in the natural environment without being denatured. This causes a problem in the environmental consciousness, so that materials to be used for these articles are investigated.

Recently, a trial is made to use biodegradable material for these articles. For example, Japanese Unexamined Patent Publication No. 5-41937 discloses a spool for fishing made of biodegradable material. Also, Japanese Unexamined Patent Publication No. 5-43637 discloses a fishing net or a fishing line made of biodegradable material.

However, in the case of the articles described above, biodegradable material is exposed to the outside. Therefore, biodegradation advances at the start of use in accordance with the environmental condition (the existence of bacterium) in which the articles are used. Accordingly, the performance and quality of the articles are remarkably deteriorated, so that a period of time in which the articles can be used is reduced, and also the frequency of use of the articles is reduced. The more excellent the biodegradability is, that is, the higher the biodegradable speed is in the natural environment, the more remarkable the above phenomenon is.

In order to solve the above problems, the present invention-has been achieved. It is an object of the present invention to provide a biodegradable article which can be used for a period of time of normal use while the performance and quality are maintained high, and further the biodegradable article exhibits an excellent biodegradability in the natural environment.

SUMMARY OF THE INVENTION

The present invention is to provide a biodegradable article comprising: a member body made of biodegradable material having a predetermined profile and a surface having a predetermined profile; and a coat formed on a surface of the member body, wherein the coat delays the biodegradation of the member body for a predetermined period of time.

In this case, objects of the biodegradable articles of the present invention are packaging articles for accommodating fishing rods, fishing tackles such as fishing rods and lures, and sports articles such as tees for golf which have chances to come into contact with the natural environment.

In the present invention, usable examples of the biodegradable material composing the member body which can be completely decomposed in the natural environment are: chemically synthesized biodegradable plastics such as polyvinyl alcohol, polycaprolactone, and aliphatic polyester; fermentatively manufactured biodegradable plastics such as polylactic acid, and polyhydroxy butyric acid; biodegradable natural plastics such as a reactant of cellulose and chitosan, and starch; and biodegradable plastics in which starch and polyvinyl alcohol are kneaded. In this connection, partially decomposing type biodegradable plastics in which starch and polyethylene are kneaded may be used.

In the present invention, it is preferable that the coat is decomposed or peeled in the use environment or in the natural environment. When the coat is peeled and decomposed, it is possible to quickly resolve the coat into the nature after it has been used or discarded. Accordingly, it is necessary to appropriately select the material of the coat giving consideration to a condition of use of the article, an environment of use of the article, and a period of time in which the article is used. For example, when a period of time in which the article is used is specified, in order to suppress and delay the biodegradation of a member body in that period, the material of the coat is selected in such a manner that the decomposing speed of the material is lower than that of the biodegradable material composing the member body.

Specifically, the material of the coat is selected in the following manner in accordance with the condition of use of the article, the environment of use of the article, and the period of time in which the article is used.

When the article is used over a long period of time being dipped in water, for example, when the article is used for a fishing line, usable examples of the coat of the fishing line are hydrolyzable plastics such as polyethylene terephthalate, polybutylene terephthalate, polyurethane of ester, poly-1,4-cyclohexane dimethylene terephthalate, and polybutylene naphthalate.

When the light irradiating time is specified, for example, when the article is applied to a fishing tackle used for dropping a line at night, photolyzable plastics obtained from a copolymer of ethylene and carbon monoxide can be used for the material of the coat.

When heat is generated by friction, for example, when the article is used for a fishing line or a guide member coming into contact with the fishing line, plastic material having thermoplastic property, the melting point of which is not more than 200° C. and preferably not more than 110° C., may be used.

When a frictional resistance is caused between the members coming into contact with the article, for example, when the article is used for a fishing line, a material may be used for the coat which is peeled off by friction. For example, when a relatively short period of time is set until the coat is peeled off, in order to facilitate the decomposition, soap having a hydrophilic property, that is, alkali salt (sodium salt is usually used) of higher fatty acid of lauric acid, myristic acid, palmitic acid, stearic acid, oleic acid, linoleic acid or linolene acid, is used for the coat. When a relatively long period of time is set until the coat is peeled off, in order to delay the decomposition, silicon material having water repellency is used. Usable examples of the silicon material are: silicone oil (the viscosity is 0.65 to 1,000,000 cps) such as dimethyl silicone oil mainly composed of polysiloxane; denatured silicone oil such as alkyl denatured dimethyl silicone oil and epoxy denatured dimethyl silicone oil; and silicone grease composed of an oil component such as methylphenyl oil and fluorosilicon oil, and also composed of a thickener agent such as lithium soap, carbon black and fluororesin. When a period of time is not particularly set until the coat is peeled off, wax which is an ester of higher fatty acid and monohydric alcohol is used, and fat and oil which is a glyceline ester of higher fatty acid is also used. In this connection, the peeling speed of wax and fat and oil are between the peeling speed of silicon oil and silicon grease and the peeling speed of soap. The coat made of the above materials can be provided on a surface of the member body by conventional means of coating.

Thickness of the coat is determined so that the coat can withstand the natural environment in the period of time in which it is used. In the case of one layer, the thickness of the coat is commonly determined to be several microns through several ten microns. In the case of plural layers, the thickness of the coat is determined to be several hundred microns, so that the thickness of the coat is sufficiently thin with respect to the thickness of the entire member body. For example, when a relatively short period of time is set until the coat is peeled off, the thickness of the coat is determined to be thin, and when a relatively long period of time is set until the coat is peeled off, the thickness of the coat is determined to be thick.

When the coat is put into practical use, it is necessary to appropriately select the material and thickness of the coat giving consideration to the condition of use, the environment and the period of use of the coat. It is possible to control the period of time from the start of use to the peeling of the coat by adjusting the adhesive property between the member body and the coat. For example, it is possible to make a surface of the member body rough by processing the surface so that the adhesive property of the coat can be enhanced and the period of time from the start of use to the peeling of the coat can be extended.

In the present invention, it is preferable that the coat can be discriminated when it has been peeled or decomposed. In this case, the coat can be discriminated by the following method when it has been peeled or decomposed.

The first method is to make a coat of material having a water-repellency property described above so that the coat is formed to be separable. In this case, the coat is water-repellent. Therefore, when the repellency of the coat is checked by watering the coat, it can be easily discriminated whether or not the coat is peeled off, or whether or not the coat is decomposed. It is possible to provide another coat on the outermost layer by using other materials with which fluororesin or fluorine particulates are mixed.

The second method is to make a coat of material with which dye or pigment is mixed so that the coat is colored and formed to be separable. Also, the second method is to make a coat of material with which lustrous metallic particles or reflecting particles are mixed so that the coat is formed to be lustrous and separable. In the above cases, as the coat is colored or lustrous, it is possible to visually discriminate whether or not the coat is peeled off, or whether or not the coat is decomposed.

In the present invention, the coat may be composed of one layer, or alternatively the coat may be composed of a plurality of layers. When the coat is composed of a plurality of layers, it is necessary to appropriately combine the aforementioned coats, giving consideration to the condition of use, the environment of use and the period of time of use of the article.

In the present invention, the coat to be peeled off or decomposed may be formed at least in a portion of the member body. Consequently, one portion of the member body may be formed of material which can not be peeled off or decomposed, and the other portions may be formed of material which can be peeled off or decomposed. For example, for the purpose of protection, when the material which can not be peeled off or decomposed is used for the coat of a portion of the member body which tends to wear, the performance and quality of the article can be well-balanced.

In the present invention, natural particulates may be used for the dye or pigment to be added to the coat material. Due to the foregoing, after the biodegradation of the coat, it can be easily resolved into the nature. The coat may be given an antibacterial property so that bacteria can not be contacted with the coat as possible, and the decomposition of biodegradable material may be delayed.

The biodegradable article of the present invention includes: a member body made of biodegradable material, the profile of which is predetermined; and a coat formed on a surface of the member body, wherein the coat delays the biodegradation of the member body by a predetermined period of time.

As shown in FIG. 1, the biodegradation of biodegradable material usually advances with the lapse of time (shown by characteristic curve X). In the present invention, when the coat is formed on a surface of the member body made of biodegradable material, the biodegradation of biodegradable material is suppressed and delayed during a period of time in which the article is used or during a period of time in which the article is not used yet, and after the use of the article, or after the article is discarded, the biodegradation can be naturally advanced (shown by characteristic curve Y). Therefore, the advance of biodegradation of the member body can be adjusted when the material and thickness of the coat are appropriately selected.

As the coat is composed in such a manner that it can be discriminated after the peeling or biodegradation, a user of the article can confirm it when the biodegradation of the member body starts or before the biodegradation of the member body starts.

DETAILED DESCRIPTION OF THE PREFERRED EMBODIMENTS

With reference to the accompanying drawings, an embodiment of the present invention will be specifically explained below.

[Embodiment 1]

Figure 1:
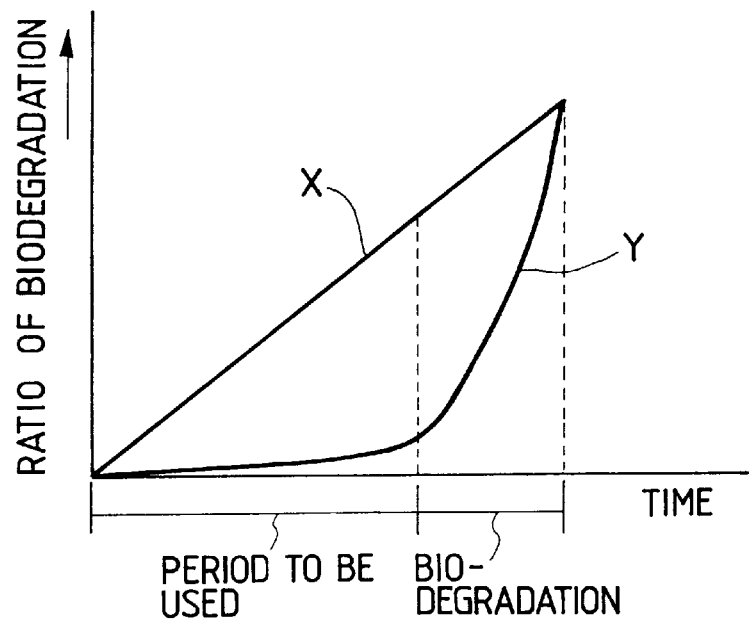
FIG. 1 is a schematic illustration showing a relation between the ratio of biodegradation and the time, that is, a speed of biodegradation is shown.
Figure 2:
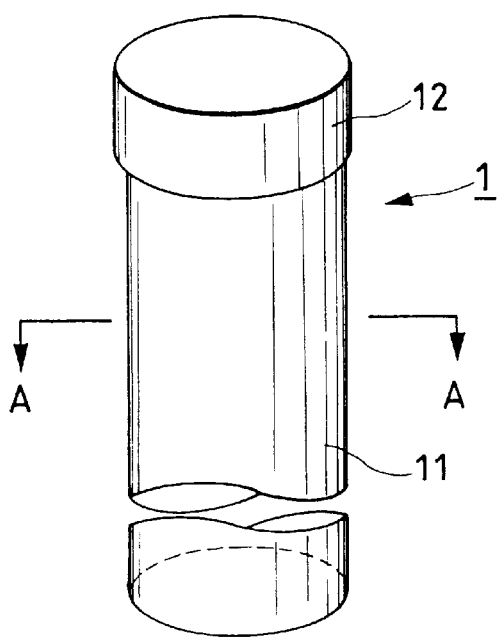
FIG. 2 is a perspective view showing a fishing tackle accommodating container which is an example of the biodegradable article of the present invention.

FIG. 2 is a perspective view of the fishing tackle accommodating container which is an embodiment of the biodegradable article of the present invention. This fishing tackle accommodating container 1 includes: a cylindrical main body 11, one end of which is closed; and a cylindrical cover 12, one end of which is closed, and the diameter of which is a little larger than that of the main body 11.

Figure 3:
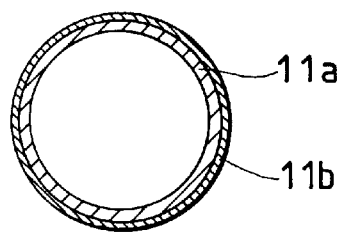
FIG. 3 is a sectional view taken on line A—A in FIG. 2.

The main body 11 and cover 12 are respectively composed of a member body made of biodegradable material, and a coat formed on the surface of the member body. As shown in FIG. 3, the main body 11 includes: a container body 1a made by means of molding polyhydroxy butyric acid, the fusing point of which is 100 to 110° C., and the thickness of the container body 11a is 0.1 to 1 mm; and a coat 11b made by means of coating polyurethane of ester with which a coloring agent is mixed, and the thickness of the coat 11b is 5 to 20 $\mu$m. Also, the cover 12 is constructed in the same manner as the main body 11.

In the fishing tackle accommodating container 1 constructed in the manner described above, the hydrolyzing speed of polyurethane of ester, which is the material of the coat 11b, is lower than the biodegradation speed of polyhydroxy butyric acid which is the material of the container body 11a. Therefore, it was possible that the article was used for 1 to 3 years without causing any problems, wherein 1 to 3 years were a period of time in which the article was normally used. After the coat 11b was hydrolyzed and collapsed and the container body 11a was exposed to the outside, the biodegradation of the container body 11a quickly advanced. As the coat 11b was colored, the exposure of the container body 11a was easily discriminated after the coat 11b had been hydrolyzed.

In order to make a comparison, the main body and cover were made only of polyhydroxy butyric acid and a fishing tackle accommodating container was manufactured. This fishing tackle accommodating container was put under the ground for 30 days, and then biodegradation advanced rather quickly. Therefore, it was impossible to maintain the appropriate performance and quality of the container.

In this connection, when the main body 11 is formed into a bag-shape made of a soft film of polyhydroxy butyric acid and a closed type fastener is attached to it, it not necessary to provide the cover 12. In this case, when an external surface of the bag-shaped main body is subjected to coating of polyurethane of polyester, the same effect can be provided. When the main body 11 is made of cloth onto which fibers of polyhydroxy butyric acid are woven, the same effect as that described above can be provided when the surface of each fiber is coated with polyurethane of ester with which a coloring agent is mixed.

[Embodiment 2]

Figure 4:
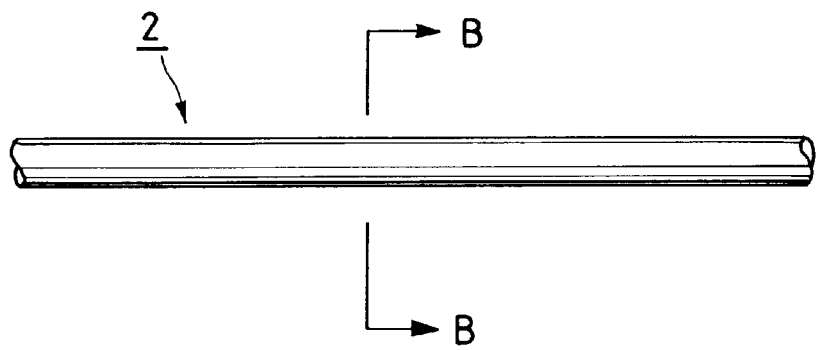
FIG. 4 is a side view showing an example of the fishing line which is another example of the biodegradable article of the present invention.
Figure 5:
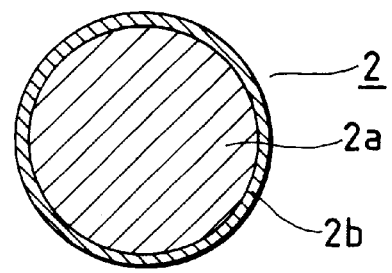
FIG. 5 is a sectional view taken on line B—B in FIG. 4.

FIG. 4 is a side view of the fishing line which is another embodiment of the biodegradable article of the present invention. FIG. 5 is sectional view taken on line A—A in FIG. 4. As shown in FIG. 5, this fishing line 2 includes: a fishing line body 2a made of aliphatic polyester by a spinning machine; and a coat 2b made of fluororesin by means of coating, wherein the thickness of the coat is 0.2 to 2.0 $\mu$m.

In the case of the fishing line 2 constructed in this manner, the coat 2b suppressed the biodegradation of aliphatic polyester which was the material of the fishing line body 2a, so that it was possible to use the fishing line 2 for one season which was a normal period of time for using the fishing line. After the coat 2b was peeled off by the friction caused between the fishing line and contacting members so that the fishing line body 2a was exposed to the outside, the biodegradation of the fishing line body 2a was quickly advanced. As the coat 2b was made of fluororesin so that the coat 2b was repellent with respect to water, whether the coat 2b remained or not was easily discriminated by observing the water-repellent condition.

In order to make a comparison, a fishing line was made in which the fishing line body was made only of aliphatic polyester. Biodegradation of this fishing line advanced in the natural condition. When it was left for 2 months after it had been once used, the performance and quality of the fishing line were deteriorated.

Figure 6:
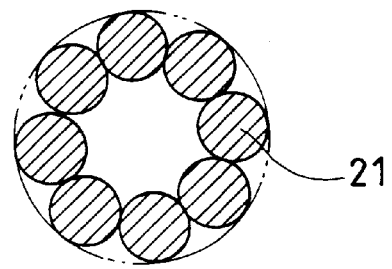
FIG. 6 is a side view showing another example of the fishing line which is another example of the biodegradable article of the present invention.
Figure 7:
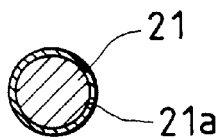
FIG. 7 is a sectional view of the line-shaped body of the fishing line shown in FIG. 6.

As shown in FIG. 6, a plurality of lines made of aliphatic polyester are arranged in the shape of net yarns, and the outside of the plurality of lines is coated with fluororesin. According to this fishing line, the same effect as that described above can be provided. As shown in FIG. 7, the coat 21a may be provided on a surface of each line 21 by means of coating.

[Embodiment 3]

Figure 8:
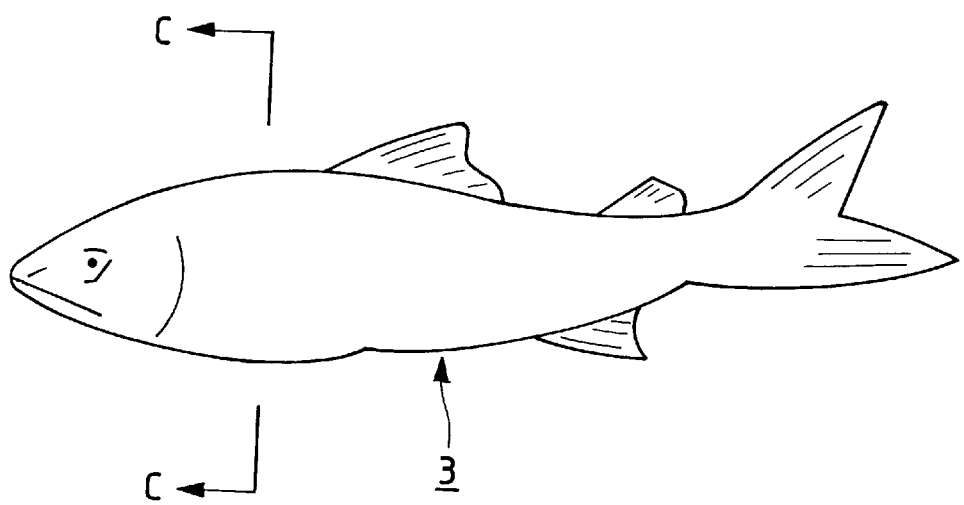
FIG. 8 is a side view of the example of the lure which is another example of the biodegradable article of the present invention.
Figure 9:
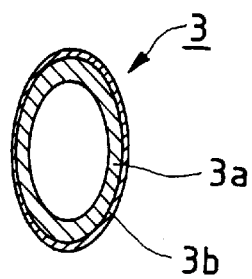
FIG. 9 is a sectional view taken on line C—C in FIG. 8.

FIG. 8 is a side view of the lure which is another embodiment of the biodegradable article of the present invention. FIG. 9 is a sectional view taken on line C—C in FIG. 8. As shown in FIG. 9, this lure 3 includes: a hollow lure body 3a made of aliphatic polyester by means of resin molding, wherein the thickness of the lure body is 0.3 to 3 mm; and a coat 3b made of hydrolyzing plastics such as polyethylene terephthalate by means of coating, wherein the thickness is several ten $\mu$m.

In the lure 3 constructed in the manner described above, the hydrolyzing speed of polyethylene terephthalate which was the material of the coat 3b was lower than the biodegradation speed of aliphatic polyester which was the material of the lure body 3a. Therefore, it was possible that the article was used for 1 year without causing any problems, wherein 1 year was a period of time in which the article was normally used. After the coat 3b was hydrolyzed and collapsed and the lure body 3a was exposed to the outside, the biodegradation of the lure body 3a advanced quickly.

In order to make a comparison, a lure was made in which the lure body was made only of aliphatic polyester. Biodegradation of this lure advanced in the natural condition. When it was used for several months, the performance and quality of the lure was deteriorated.

Figure 10:
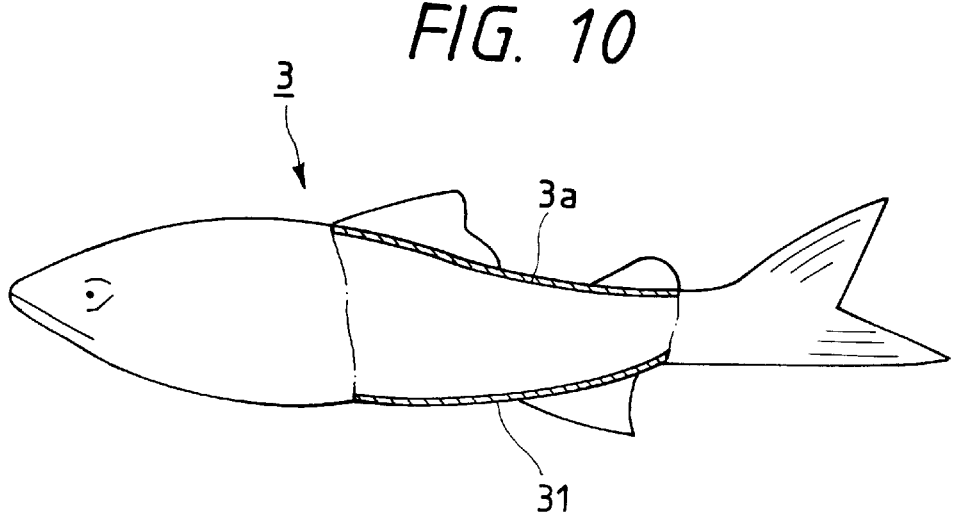
FIG. 10 is a partially exploded side view showing another example of the lure which is another example of the biodegradable article of the present invention.

In this connection, the same effect as that described above can be provided by the lure 3 illustrated in FIG. 10, which is constructed in the following manner: The lure body 3a is made of aliphatic polyester, and patterns are formed in the major part on the external surface of the lure body 3a using urethane resin or epoxy resin, and the coat 3b is formed in a region which is difficult to be damaged or in a region which is not conspicuous. In this case, first, the coat 3b in a region 31 is hydrolyzed, and then the lure body 3a in a region corresponding to the region 31 is subjected to biodegradation. In regions except for the region 31, patterns are formed by urethane resin or epoxy resin. Therefore, biodegradation is not caused in these regions. For this reason, biodegradation is caused inside the lure 3 shown in FIG. 10, wherein the region 31 is a start point of the biodegradation.

As described above, the present invention is to provide a biodegradable article comprising: a member body made of biodegradable material having a predetermined profile; and a coat formed on a surface of the member body, wherein the coat delays the biodegradation of the member body for a predetermined period of time. Therefore, an advance of biodegradation of the member body can be appropriately adjusted. Accordingly, the advance of biodegradation can be suppressed while the article is not used or while the article is being used, so that the high performance and quality of the article can be maintained. After the coat has been peeled off or decomposed, the biodegradation of the article quickly advances in the natural condition, so that the natural environment can be protected.

When the coat has been peeled off or decomposed, it is possible to discriminate the peeling or decomposition of the coat. Therefore, it is possible to recognize the start of biodegradation of the member body. Accordingly, the article can be used in a condition of high performance and quality at all times.

Figure 11:
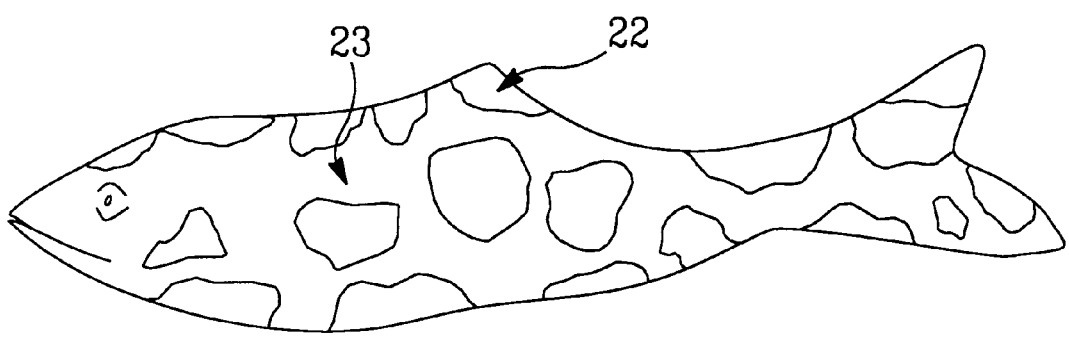
FIG. 11 is a side view of another embodiment of the biodegradable article of the present invention.
Figure 12:
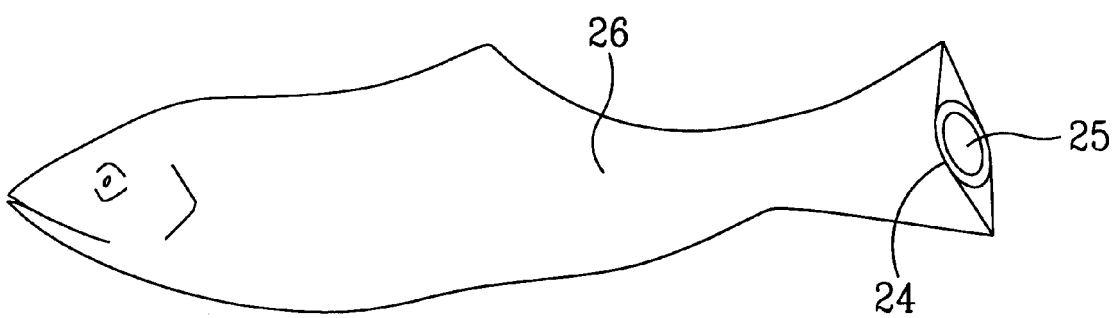
FIG. 12 is a side view of another embodiment of the biodegradable article of the present invention.

Another feature of the claimed invention resides in the ability to vary the rate of decomposition of the biodegradable article. FIG. 11 depicts one such alternate embodiment. In this embodiment only a portion of the member body is coated 22. The remaining portion 23 of the member body is exposed to the environment. By varying the percentage of the outer surface of the member body which is coated, the rate of decomposition may be varied. A member body, with a higher percentage of its outer surface which is coated, will inherently take more time to biodegrade than a member body which is less coated. FIG. 12 represents a biodegradable article having an opening 24 exposing an inner surface 25 to the environment. In this embodiment only the outer surface 26 of the member body is coated. The inner surface 24 is left untreated and exposed to the environment. By varying the size and shape of the opening, and thus varying the exposure of the inner surface 25 to the environment, the rate of biodegradation may be varied.

Another useful feature of the claimed invention is the ability to accelerate the rate of decomposition after the article has expended its useful life. In this embodiment the inner surface of a hollow member body, as shown in FIGS. 8–9, is not coated. When it is desired to accelerate the decomposition rate of the article, the member body is punctured or torn to form a portion which allows water to enter the member body. This portion exposes the material of the member body directly with the environment to accelerate decomposition.

Delaying biodegradation of the article may also be achieved by providing the coat with an antibacterial property. Such an antibacterial property will prevent bacteria from contacting the article which would accelerate biodegradation. The antibacterial property may be formed from both inorganic and organic substances. The inorganic antibacterial substance is preferably formed of a composition comprising: calcium carbonate; ceramic such as silica alumina; silica gel; zirconium phosphate; zeolite; glass; and metal such as gold, silver or copper. The organic antibacterial substance is preferably formed of a composition comprising: Japanese horseradish (wasabi); mustard; and saccharose fatty acid ester.

As previously discusses, the coat may be formed of a material having a hydrophilic property. Such a property tends to diffuse water to prevent water from beading and spreads the water over a larger surface area to increase the rate of biodegradation. Another method of enhancing water diffusion is to roughen the surface of the coat. Both chemical and physical methods may be used to roughen the surface of the coat. One method to roughen the coat chemically is to apply an alkali or acidic solution to the coat. Physical methods to roughen the coat include: sandblasting; barrel-grinding; honing; corona discharge treatment; plasma treatment; and spark treatment. Yet another method of forming the coat having a water diffusing property is to form a thin metal layer on the coat. The metal layer is then oxidized to provide a roughened surface. An example of such a technique is forming a layer of aluminum on the coat and subjecting the metal layer to alumite processing (anodic oxide coating). All of these methods facilitate an increased surface area which is exposed to water to promote biodegradation.

Roughing the external surface of the article or coat can also provide a means to discriminate the decomposition of the coat. As the article ages and the coat decomposes to expose the underlying article, the surface of the exposed article will inherently change. For example, if the article is formed of a rougher surface than the coat, then when the coat begins to peel, exposing the surface of the underlying article, then the difference in surface texture can be detected by both visual and physical senses. The surface of the entire article will feel different to the touch as well as having a different appearance.

While the biodegradable article of this invention has been shown and described with reference to a particular embodiment, it will be understood to those possessing skill in the art that various changes to the form and detail may be made therein without departing from the spirit and scope of the invention.

What is claimed is:

1. A biodegradable article capable of biodegrading when exposed to an environment comprising:

a member body made of a biodegradable material having a surface of a predetermined profile, said biodegradable material having a first resistance to biodegradation wherein, when said material is exposed to said environment said material is degraded; and a biodegradable coat formed on said surface of said member body, said biodegradable coat having a second resistance to biodegradation substantially higher than said first resistance of said member body, wherein, when said biodegradable article is exposed to said environment the biodegradation of said member body is delayed for a predetermined time: and an evaluation means for evaluating a current state of decomposition of said biodegradable article by one of tactile and visual inspection of said biodegradable article, said inspection being a relative comparison of a condition of said biodegradable coat with respect to said member body.

2. The biodegradable article according to claim 1, wherein said biodegradable coat is made of a water repellant material having substantially greater water repellant properties than said member body such that when said biodegradable coat biodegrades an overall water repellant property of said article is reduced, said means to discriminate said current state of decomposition of said article being provided by said relative comparison of said water repellant properties of said member body with respect to said coat.

3. The biodegradable article according to claim 1, wherein said biodegradable coat is made of a substantially different color than said member body, when said biodegradable coat progressively degrades said member body is correspondingly progressively revealed such that an overall color of said biodegradable article is changed, said means to discriminate said current state of decomposition being provided by said relative comparison of said color of said biodegradable coat to said overall color of said member body.

4. The biodegradable article according to claim 1, wherein said surface of said member body is formed as a rough surface to enable both said tactile and visual inspection of said biodegradable article, whereby an exposure of said rough surface indicates a relatively advance state of biodegradation of said biodegradable coat.

5. The biodegradable article according to claim 1, wherein said member body comprises an antibacterial material.

6. A biodegradable article capable of biodegrading when exposed to an environment comprising:

a member body made of a biodegradable material having a surface of a predetermined profile, said biodegradable material having a minimal resistance to biodegradation wherein, when said material is exposed to said environment it is degraded; and a biodegradable coat formed on discrete and intermittent areas of said surface of said member body such that a portion of said surface of said member body remains exposed to said environment to thereby selectively predetermine a rate of biodegradation, said biodegradable coat having a resistance to biodegradation substantially higher than said resistance of said member body, wherein, when said biodegradable article is exposed to said environment the biodegradation of said member body is delayed for a predetermined time.

7. A biodegradable fishing lure designed to be pulled through water in order to attract fish and capable of biodegrading when exposed to an environment comprising:

a hollow member body having an inner surface and an outer surface, said member body being made of a biodegradable material having a surface of a predetermined profile, said biodegradable material having a minimal resistance to biodegradation wherein, when said material is exposed to said environment said material is degraded;

a biodegradable coat formed on said outer surface of said member body, said biodegradable coat having a resistance to biodegradation substantially higher than said resistance of said member body; and an aperture formed in said member to thereby expose said inner surface directly to said environment, said aperture being selectively sized to control exposure of said inner surface to said environment and thereby control a rate of biodegradation of said member body.

8. A biodegradable article capable of biodegrading when exposed to an environment comprising:

a member body made of a biodegradable material having a surface of a predetermined profile, said biodegradable material having a first resistance to biodegradation wherein, when said material is exposed to said environment said material is degraded; and a biodegradable coat formed on said surface of said member body, said biodegradable coat having a second resistance to biodegradation substantially higher than said first resistance of said member body, wherein, when said biodegradable article is exposed to said environment the biodegradation of said member body is delayed for a predetermined time; and an evaluation means for evaluating a current state of decomposition of said biodegradable article by one of tactile and visual inspection of said biodegradable article, said inspection being a relative comparison of a condition of said biodegradable coat with respect to said member body; wherein said biodegradable coat comprises a water diffusing material.

* * * * *